United States Patent Office 3,692,471
Patented Sept. 19, 1972

3,692,471
PROCESS FOR REMOVAL OF POLYSULFIDES
John Edwin Lyberger, Kingsville, Ohio, assignor to The Sherwin-Williams Company, Cleveland, Ohio
No Drawing. Filed Aug. 27, 1970, Ser. No. 67,565
Int. Cl. C01f *11/00;* C01g *3/12*
U.S. Cl. 423—561
5 Claims

ABSTRACT OF THE DISCLOSURE

The process disclosed herein comprises the treatment of a solution of barium sulfide or strontium sulfide containing undesired polysulfides for removal of these polysulfides by reaction with metallic copper which effects removal of the polysulfide by reaction therewith to produce insoluble sulfides.

The barium or strontium sulfide solution is thereby sufficiently reduced in polysulfide content to permit subsequent precipitation of the corresponding carbonate without contamination by polysulfides.

BACKGROUND OF THE INVENTION

Field of the invention

This invention relates to the removal of polysulfides from barium sulfide and strontium sulfide solutions. More specifically, it relates to the reaction of metallic copper with such polysulfides for the removal thereof.

Related prior art

Barium and strontium monosulfide aqueous solutions upon standing develop substantial polysulfide concentrations. In the preparation of barium carbonate or strontium carbonate by the reaction of carbon dioxide with aqueous solutions of barium sulfide or strontium sulfide, these polysulfides produce impurities which contaminate the desired barium carbonate or strontium carbonate. Since the barium sulfide and strontium sulfide solutions generally contain these polysulfides, it is difficult to avoid such contamination. It is desirable, therefore, that barium sulfide or strontium sulfide solution be freed of polysulfides before the carbon dioxide reaction is effected to precipitate the corresponding carbonate.

While reference is made to barium sulfide and strontium sulfide solutions it is recognized that these sulfides may actually be in hydrolyzed form as illustrated by the following reaction:

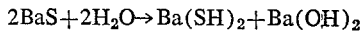

Therefore reference herein to barium and strontium monosulfide solutions includes solutions of these compounds in such hydrolyzed forms.

STATEMENT OF THE INVENTION

In accordance with the present invention, it has now been found that polysulfides can be removed from barium sulfide and strontium sulfide solutions or mixtures thereof by treatment of these solutions with metallic copper thereby precipitating the corresponding metallic polysulfide and leaving a solution of barium sulfide or strontium sulfide containing very little or even trace amounts of the polysulfides. These very small amounts, even if precipitated upon conversion of the barium or strontium sulfide to the corresponding carbonate, or other compounds, are well below the amounts that can be tolerated in the ultimate products.

Since the reaction of the polysulfide with the copper is a surface reaction, the rate of polysulfide removal depends upon the amount of surface available for reaction and the residence time for contact between the copper surface and the solution containing the polysulfides.

Obviously the amount of copper surface available for reaction per unit weight of copper will depend on the size and shape of the copper being used, with small particles of copper giving greater area than large particles per unit of weight. Since deposits or coatings on the copper surfaces will decrease the amount of surface available for reaction, provision should be made either to remove the coating, to replace the coated copper with fresh copper, or to have sufficient copper present originally to provide sufficient reactive surface all through the reaction even though some of it is made unavailable for further reaction by the coating of that portion of the surface.

In determining the amount of surface desirable to maintain a satisfactory reaction rate for removal of polysulfide, it is advantageous to determine this on freshly added copper and then thereafter maintain at least this amount of clean surface by either adding additional copper or cleaning the copper so as to maintain sufficient clean copper surface to maintain a satisfactory reaction rate.

For practical purposes, it is generally desirable to have at least 5000 sq. cm. or at least 570 sq. in. of clean copper surface available per gram of polysulfide contained in the solution per minute of residence time, preferably 8000 sq. cm. or at least 1230 sq. in. per gram of polysulfide per minute of time. Obviously as the residence time is increased the amount of clean copper surface may be reduced. However since the surface is being coated by deposits during the treatment, less surface is available unless the coating is being removed continuously. Advantageously the treatment is effected with at least 460 sq. in. of clean copper surface per gram of polysulfide in the solution and for a period of at least 2.5 minutes. Therefore, when the copper surface becomes coated by precipitated polysulfide to the extent that less than this specified amount of surface is available for reaction with the polysulfides, then the reaction rate becomes less than practical and it is desirable at that time to clean the copper surface or to add additional clean copper, or to remove the coated copper and replace or regenerate the copper surface for subsequent addition to such solutions.

Obviously, if more than this minimum amount of surface is continuously available, then the reaction proceeds more quickly. It is desirable, therefore, to keep the amount of copper surface available for reaction well above such a minimum amount. Moreover, in order to increase the production rate and make optimum use of the volume of the equipment available, it is desirable to use well above this minimum amount of copper surface and to maintain conditions such that the throughput of the equipment will be kept at an optimum.

While the reaction rate is also dependent somewhat upon the temperature, the rate is sufficiently attractive at convenient temperatures, that is from 20° C. to 100° C., so that no special provisions need to be made for maintaining particularly high temperatures. The upper limit of temperature is more or less determined by practical considerations, and it is generally preferable to operate in the range of 50–70° C.

The pH range of the barium sulfide and strontium sulfide solutions as obtained are generally satisfactory. Generally any alkaline pH is satisfactory and preferably it is above 10.

In operating the process of this invention, it is generally desirable, as previously indicated, to remove the deposited copper sulfides from the copper surface constantly throughout the reaction. Advantageously this may be effected by ball milling the reaction solution during the reaction of the copper with the polysulfide. The copper itself, in various forms such as pellets, balls, rods, turnings, powder, etc., can serve at least in part as the solid mass which removes by attrition the deposited sulfide coating during the treatment process of this invention. In addition to the copper particles themselves serving as attrition agents, steel balls, porcelain balls and other solid particles generally used for ball milling can be used to aid in this function. If the materials are such that tumbling is not adequately effected, bars or protrusions can be fastened to the inner wall of the mill to promote tumbling.

In addition to the above described method of using ball milling equipment as the reactor for carrying out the process of this invention, it is also possible to use other types of equipment for contacting the barium sulfide or strontium sulfide solution with the copper surface, and either simultaneously or subsequently removing the sulfide deposits from the copper surface.

For example treating columns containing the copper in various forms such as rods, hollow cylinders, turnings, pellets, etc., can have the solution flowed therethrough and the flow through such column periodically stopped or diverted and the sulfide deposits removed either by hydrogenation or oxidation treatment which will convert the sulfide to soluble or otherwise removal forms and thereby regenerate clean surfaces on the copper for subsequent renewed contact with the barium sulfide or strontium sulfide solution. It may also be desirable to remove the copper filler from the column, replace it with new or fresh copper surfaces, and then remove the sulfide deposits from the removed copper filler by ball milling, or other appropriate physical or chemical treatment, following which the regenerated copper surfaces can be subsequently returned to the column.

In other modifications, copper powder can be suspended in a reactor filled with the solution, and the powder maintained in suspension by vigorous agitation, having a portion of the solution flowing from the reactor and carrying with it some of the suspended copper sulfide powder, which is then allowed to settle or is filtered from the solution and the sulfide coating removed from the powder by various means such as indicated above. Then the barium sulfide or strontium sulfide solution, from which the copper powder has been removed and in which there are only small amounts of polysulfides remaining, can then be processed to convert the barium sulfide or strontium sulfide to the corresponding carbonate or to whatever other purpose it is desired to use the purified solution.

In the preceding treatment using suspended copper powder, fresh barium sulfide or strontium sulfide solution is fed continuously to the reactor and fresh copper is also added, these being fed either together in a single stream or individually.

By the process of this invention it is found possible to remove 80–90% of the polysulfide, and even higher amounts depending on the residence time and the proportionate amount of available copper surface. For example, solutions containing 2 grams per liter of polysulfide can be easily and very practically reduced to 0.2 gram per liter with a residence time of 19 minutes. Solutions containing 0.2% of polysulfide can be reduced to 0.02% in a corresponding residence time. Where it is desired to remove the polysulfides to even lower amounts, it is possible either by increasing the residence time or by performing a second removal operation starting with a solution having its polysulfide content reduced by a prior removal step.

Moreover, while polysulfide or excess sulfur are the impurities to be removed from the barium or strontium sulfide solution, the sulfide coating on the pellets may be of various forms, although it is believed that this is primarily cuprous sulfide instead of or in addition to small amounts of cupric sulfide, copper oxide, copper sulfate, etc.

Ball mills in various sizes are available commercially which can be used in carrying out the ball milling operation described herein. For example, one particularly suitable is designated as "Denver" Ball Mills with Trunnion Overflow Discharge, particularly suitable for wet overflow. In such mills, there is a cylindrical outer shell mounted horizontally in such a manner that it can be rotated on its linear axis, one opening being much smaller than the other so that liquid fed into the mill through the smaller opening will run to the opposite end of the cylinder and out the larger opening at the opposite end. During the course of passing from one end of the cylinder to the opposite end, the liquid will be in contact with the solid particles being tumbled by the rotation of the mill. This equipment can be of any desired size, anywhere from small laboratory size to large commercial types.

This same design of wet flow ball mill can be duplicated by using a cylindrical bottle of glass, metal, plastic, etc., preferably of polyethylene, having the bottle opening serve as the trunnion overflow outlet and a smaller opening made in the opposite end (or bottom of the bottle) to serve as the inlet. This cylinder can be supported in a horizontal position by two driven rollers which will provide rotation to the cylinder about its linear axis. A liquid feed line can be extended into the smaller opening to introduce the sulfied solution with the liquid being supplied from a reservoir containing an adequate supply of the solution. The liquid can be flowed by gravity from the reservoir or pumped therefrom. The rate of feed can be controlled by a valve or by adjustment of the pump. Once the level of liquid in the horizontally rotated cylinder reaches the level of the larger opening at the opposite end of the cylinder, where it overflows into a receptacle carrying with it suspended metal sulfide particles. The receiving receptacle can feed the liquid into subsequent treating equipment for filtering, decantation, carbonation, etc.

Various methods of practicing the invention are illustrated by the following examples. These examples are intended merely to illustrate the invention and not in any sense to limit the manner in which the invention can be practiced. The parts and percentages recited therein and all through the specification, unless specifically provided otherwise, are by weight.

EXAMPLE I

In each of a number of experimental runs 24 liters of 12° Bé barium sulfide solution is placed in a reservoir adapted to feed into a 1-liter ball mill. The mill is made from a 1-liter polyethylene bottle as described above. 220 cylindrical copper pellets of ⅜" length and ⅜" diameter are placed in the mill. These pellets have a total apparent volume of 250 ml., a weight of 1325 grams and a calculated surface area of 970 sq. cm. About 100 ml. of porcelain balls are also added to aid in tumbling. The liquor volume of the mill with these balls is determined to be about 330 ml. The mill is rotated at 67 r.p.m. to give a peripheral wall velocity of 1.40 ft./sec. The barium sulfide solution is fed into the mill at a temperature of 70° C. at a rate of 1 liter per 15 minutes to give an average residence time of 4.3 minutes in the mill. A temperature drop of 5–10° C. is incurred by the liquor passing through the mill. The polysulfide content of the feed liquor and of the exit liquor are determined by arsenite titration. BaS determinations are made by titrating weighed samples with iodine and reporting total oxidizables as BaS. The polysulfide content is reduced from 2% in the feed liquor to 0.2% in the exit liquor. The copper sulfide removed from the pellets by the ball milling flows out with the exit liquor and there is no buildup in the mill. There is no drop in efficiency in the course of the runs, and the process can operate indefinitely by adding copper pellets to replace the copper used up in the process. The BaS solution thus reduced in polysulfide content is used to produce $BaCO_3$ acceptable in low polysulfide by reaction with carbon dioxide.

EXAMPLE II

The procedure of Example I is repeated using 504 grams of copper shot No. 2 and 466 grams of porcelain balls with a barium sulfide solution having a polysulfide content of 0.25 gram per liter. Using a throughput rate of 4 liters per hour, the polysulfide level is reduced to 0.05 gram per liter.

EXAMPLE III

The procedure of Example II is repeated using instead of the barium sulfide solution a 6.4° Bé solution of strontium sulfide containing 0.3 gram per liter of polysulfide. Using a feed rate of 4 liters per hour, the polysulfide content is reduced to 0.04 gram per liter in the exit solution. This is treated with carbon dioxide to produce strontium carbonate of satisfactorily low polysulfide content.

EXAMPLE IV

The procedure of Example I is repeated using in place of the copper pellets 700 grams of heavy copper turnings together with 359 grams of porcelain balls. A feed rate of 6 liters of barium sulfide per hour reduced the polysulfide content from 0.14 gram per liter in the feed liquor to 0.02 gram per liter in the exit liquor. X-ray diffraction analysis of the product filtered from the desulfurized barium sulfide shows predominantly $Cu_2S$ with traces of $Cu_2O$, CuO and some $BaSO_3$ also being present.

EXAMPLE V

The procedure of Example IV is repeated using 668 grams of previously used copper turnings and 32 grams of new turnings together with 360 grams of porcelain balls. A barium sulfide solution having 0.25 gram per liter of polysulfide is used at a feed rate of 3.75 liters per hour to reduce the polysulfide content to 0.02 gram per liter in the exit liquor. When the feed rate is increased to six liters per hour, the polysulfide content in the exit liquor increases to 0.03 gram per liter.

EXAMPLE VI

The procedure of Example IV is repeated using a strontium sulfide solution of 4.7° Bé having a polysulfide content of 0.20 gram per liter, and using 671 grams of copper turnings from previous runs, 29 grams of fresh copper turnings, and 400 grams of porcelain balls. Using a feed rate of six liters per hour, the polysulfide content is reduced to 0.05 gram per liter.

EXAMPLE VII

A series of experiments are performed using a 200 ml. sample of 15.0° Bé barium sulfide aqueous solution containing 0.38 gram* of polysulfide per liter placed in a centrifuge bottle with an amount of the copper and in the form specified in the table below. The bottle is capped, shaken by hand, and periodically the bottle is opened and a sample removed and titrated for polysulfide by the arsenite method. The temperature at the start is 75° C., but this decreases during the shaking.

| | |
|---|---|
| Metal | Copper |
| Grams | 50 |
| Form | Shot |
| Polysulfide content (grams/liter): | |
| 0 minute | 0.38 |
| 1 minute | 0.27 |
| 2 minutes | 0.10 |
| 3 minutes | 0.03 |
| 6 minutes | — |
| 11 minutes | — |

The invention claimed is:

1. The process for removing polysulfides from an aqueous monosulfide solution selected from the class consisting of barium sulfide and strontium sulfide in which said polysulfides are present as impurities, comprising the step of contacting said monosulfide solution at a temperature of 20–100° C. and at an alkaline pH with at least 460 square inches of clean copper metal surface per gram of polysulfide in said solution, and separating the material deposited on said copper surface from said solution.

2. The process of claim 1 in which said metal is cleaned of deposits by ball milling said metal surface during the contacting of said solution with said surface.

3. The process of claim 2 in which said solution is at a temperature of 50–75° C.

4. The process of claim 3 in which said contacting is for a residence time of at least 2.5 microns.

5. The process of claim 4 in which the contacting of said solution with said metal is effected at a pH of at least 10.

References Cited

UNITED STATES PATENTS

| | | | |
|---|---|---|---|
| 1,774,883 | 9/1930 | Glaeser | 23—134 X |
| 2,227,547 | 1/1941 | Lanzetti | 23—134 |
| 3,518,187 | 6/1970 | Groszek | 23—134 X |
| 3,577,231 | 5/1071 | Pesses | 23—134 |

FOREIGN PATENTS

| | | | |
|---|---|---|---|
| 354,607 | 8/1931 | Great Britain | 23—134 |

EDWARD STERN, Primary Examiner

U.S. Cl. X.R.

423—135, 136

---

*A different BaS solution is used with the antimony (containing 0.886 gram of polysulfide per liter).